(12) United States Patent
Bäbler et al.

(10) Patent No.: US 7,686,993 B2
(45) Date of Patent: Mar. 30, 2010

(54) COLORED POLYMERIC ARTICLES HAVING HIGH MELT TEMPERATURES

(75) Inventors: Fridolin Bäbler, Teresópolis (BR); Leonardus Franciscus Peeters, Magden (CH)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 1370 days.

(21) Appl. No.: 10/795,544

(22) Filed: Mar. 8, 2004

(65) Prior Publication Data

US 2004/0217512 A1 Nov. 4, 2004

Related U.S. Application Data

(60) Provisional application No. 60/455,640, filed on Mar. 18, 2003.

(51) Int. Cl.
*D01F 1/06* (2006.01)

(52) U.S. Cl. ............ 264/78; 8/920; 8/922; 8/924; 264/211

(58) Field of Classification Search ............ 264/78, 264/211; 8/920, 922, 924
See application file for complete search history.

(56) References Cited

U.S. PATENT DOCUMENTS

| | | | | |
|---|---|---|---|---|
| 3,619,123 A | | 11/1971 | Walz et al. ............ 8/173 |
| 3,653,803 A | * | 4/1972 | Hammer ............ 8/540 |
| 3,829,543 A | * | 8/1974 | Robertson ............ 264/78 |
| 3,846,507 A | | 11/1974 | Thomm et al. ............ 260/857 |
| 3,939,113 A | | 2/1976 | Wick et al. ............ 260/40 |
| 4,185,962 A | * | 1/1980 | Gerber et al. ............ 8/552 |
| 4,265,632 A | | 5/1981 | Papenfuhs et al. ............ 8/512 |
| 4,267,306 A | | 5/1981 | Davis et al. ............ 528/226 |
| 4,309,180 A | * | 1/1982 | Lacroix et al. ............ 8/609 |
| 4,328,159 A | | 5/1982 | Adam ............ 260/374 |
| 4,374,641 A | | 2/1983 | Burlone ............ 8/557 |
| 4,438,140 A | | 3/1984 | Guillon et al. ............ 424/61 |
| 4,553,976 A | | 11/1985 | Raisin et al. ............ 8/639 |
| 4,655,786 A | * | 4/1987 | Navratil et al. ............ 8/922 X |
| 4,791,153 A | * | 12/1988 | Yamanaka ............ 523/453 |
| 5,372,864 A | | 12/1994 | Weaver et al. ............ 428/36.92 |
| 5,741,532 A | * | 4/1998 | Lilly et al. ............ 425/197 |
| 5,993,958 A | * | 11/1999 | Okutsu ............ 428/338 |
| 6,033,445 A | | 3/2000 | Lacroix et al. ............ 8/643 |
| 6,136,433 A | | 10/2000 | McIntosh et al. ............ 428/364 |
| 2002/0156161 A1 | | 10/2002 | Koshida et al. ............ 524/190 |
| 2003/0162900 A1 | * | 8/2003 | Joachimi et al. ............ 525/178 |
| 2004/0138348 A1 | * | 7/2004 | Babler ............ 524/88 |

FOREIGN PATENT DOCUMENTS

| | | |
|---|---|---|
| GB | 1190410 | 5/1970 |
| GB | 1208402 | 10/1970 |
| GB | 1215476 | 12/1970 |
| GB | 1219420 | 1/1971 |
| WO | WO 02/092681 A1 * | 11/2002 |

OTHER PUBLICATIONS

Derwent Abstr. 1985-246641 [40] for JP 60162881 (1985).
Chem. Abstract 126:294568 for JP 09067781 (1997).
Chem. Abstr. 116:108295 for PL 153174 (1991).
Chem. Abstr. 116:108294 for PL 153173 (1991).
Chem. Abstr. 114:83881 for PL 147938 (1989).
Derwent Abstract 1997-012583 for DE 19518849 (1996).
Derwent Abstr. 1994-295423 for DE 4408526 (1994).

* cited by examiner

*Primary Examiner*—Leo B Tentoni
(74) *Attorney, Agent, or Firm*—Shiela A. Loggins

(57) ABSTRACT

The present invention relates to polymeric articles that are colored using an unformulated heat stable black, blue or violet dye during melt processing, for example a melt spinning process. The process eliminates the need for acid bath dyeing of high melt polymeric materials. The polymeric articles are for example polyester or polyamide.

11 Claims, No Drawings

COLORED POLYMERIC ARTICLES HAVING HIGH MELT TEMPERATURES

This application claims the benefit under 35 USC 119(e) of U.S. provisional application No. 60/455,640, filed Mar. 18, 2003.

SUMMARY

The present invention relates to colored polymeric articles and a method for their preparation by the incorporation of specific dyes in the polymerization step, or in the melt processing step, for example a melt spinning process.

BACKGROUND

Due to unusually good mechanical properties, such as toughness, pliability, elasticity, and mechanical strength, polyamides belong to a class of high performance polymers with significant technical importance.

Polyamides are polar polymers with a high melting point of generally above 250° C. Only high performance pigments with outstanding heat stability can be used for coloring polyamides in a melt process. Since few organic pigments possess the properties needed to color polyamide, the availability of shades is limited. For this reason, large quantities of polyamide fibers are still bath dyed using special dyes like for example the acid dyes.

Many patents describe the dyeing of polyamide materials with dyes, in particular with acid dyes. For example U.S. Pat. No. 3,619,123 describes a process for dyeing synthetic polyamide fibers in the presence of one or more aromatic sulfonic acids to produce uniform dyed fibers. U.S. Pat. No. 4,438,140 describes salts of acid colorants and specified copolymers containing tertiary amino groups for its use in cosmetics. U.S. Pat. No. 6,136,433 describes melt-spinning a nylon fiber from a host polymer formed from a mixture of amide monomers and at least one hindered piperidine compound. A colorant is dispersed throughout the host polymer.

U.S. Pat. No. 4,374,641 describes a polymeric color concentrate for thermoplastic polymeric materials and solution dyeing of a nylon fiber. The color concentrate is prepared from a blend of a water or organic solvent-dispersible polymer and a soluble dye or pigment. The preferred polymer is a polyamide blend with a polyamide component having improved basic dye affinity, as described in U.S. Pat. No. 3,846,507.

Japanese Patent No. 60/162,881 describes shaped goods comprising of a polyamide and melamine derivative by immersing the shaped goods in an aqueous solution containing 0.1 to 1.5 wt. % of acetic or formic acid or ammonium sulfate at 40 to 45° C. and adding 0.1 to 1.0 wt. % of an acid dyestuff, elevating the temperature of the dyeing solution to 80 to 100° C. in 30 to 60 minutes and maintaining that temperature for 30 to 60 minutes then washing and drying the goods.

Japanese Patent No. 09-067781 describes black metal complex dyes and compounds having an absorption maximum at 650-800 nm for dying leather and fibers.

Polish Patent Nos. PL 147,938, PL 153,173 and PL 153, 174 describe the manufacture of black 1:2 chromium-azo compound complexes for dyeing wool, polyamide fibers and leather, and U.S. Pat. No. 4,553,976 describes 1:2 chromium or cobalt complexes of azo dyes for dyeing natural or synthetic polyamide fibers.

U.S. Pat. Nos. 4,328,159 and 4,309,180 describe anthraquinone acid and/or fiber reactive dyes for dyeing wool and polyamide fibers or leather.

German Patent Nos. 4,408,526 and 19,518,849 and U.S. Pat. Nos. 6,033,445 and 4,309,180 describe anthraquinone compounds for dying synthetic polyamide(s), wool, leather and as printing inks.

Commercially available dyes that are used to dye polyamide articles in a bath dyeing process, are commonly formulated. That is, they contain additives and salts to increase the speed and color yield of the dyeing process. The dye concentration of such formulations is only about 40 to 80%. The resulting dyed polyamide articles, in particular the fibers need to be washed with plenty of water.

Due to the incompatibility of such additives found in dye formulations, commercially available dyes cannot be used directly in a melt spinning process to color polyamide fibers. Additionally, such formulations frequently manifest insufficient heat and light stability when applied by the melt spinning process.

None of the above literature describes the use of the claimed dyes for coloring polyamide in an extrusion, molding or melt spinning process. Surprisingly, it was found that selected dyes when used in their unformulated form can be advantageously employed for coloring polyamide articles, such as flocks, granules, wires, ribbons, foils, sheets, molded parts or fibers, in particular textile fibers like nylon-6 fibers in a melt process.

Thus, the present invention relates to a process for the preparation of colored polymeric articles having high processing temperatures, such as greater than 220° C., preferably greater than 240° C. and molded articles made therefrom by employing specific heat stable unformulated dyes in the melt process, for example the melt spinning process. Processing temperatures are the temperature ranges commonly provided by the polymer suppliers and generally do not exceed 340° C., more preferably 320° C. Thus, the selected dyes allow for the coloring of for example polyamide fibers in various shades very economically using the melt spinning process instead of bath dyeing.

DETAILED DESCRIPTION OF THE INVENTION

Surprisingly, it was found that specific unformulated dyes can advantageously be used to color polymeric materials having high melt temperatures that are to be subjected to melt processing. The colorant can be added to the polymeric material in the melt or even during the polymerization step yielding strongly colored polymeric articles having excellent heat and good light stability for textile and others application. Unformulated dyes means, for purposes of this application, a dye composition that does not contain salts or additives commonly used to increase the speed and color yield in a bath dyeing process. Such salts and additives are well-known, and include, sodium or potassium chloride, sulfate, acetate, or phosphates, tensides like sulfonated oils, alkylaryl sulfonates, sulfated alcohols, quaternary ammonium salts of aliphatic- or alkylaryl amines or N-hetero cyclic compounds and the water-soluble polymers, copolymers and/or polymer derivatives.

Any polymeric material, which can be molded or spun to fibers, can be colored by the inventive process. The process is particularly advantageous for coloring of polar polymeric materials having a high processing temperature. In particular the commercially available polycarbonate, polymethacrylate and especially polyesters such as polyethylene terephthalate, polytrimethylene terephthalate, polybutylene terephthalate, polylactic acid and polyamides are most preferred, such as the nylon-x or nylon-xx types, like nylon-6, nylon-12 or nylon-6,6 and nylon-6, 12.

One class of suitable dyes selected for purposes of this invention include the heat stable metal complex black dyes in their unformulated form, for example the black metal complex dye of formula (I)

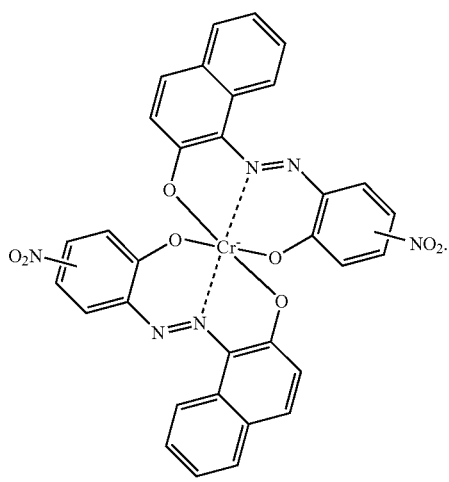

(I)

A particularly preferred black dye is a 2-naphthalenol-1-[(2-hydroxy-4-nitrophenyl) azo], chromium complex sodium salt according to formula (I).

Another class of suitable dyes are the blue anthraquinone dyes in their unformulated form, of formula (II),

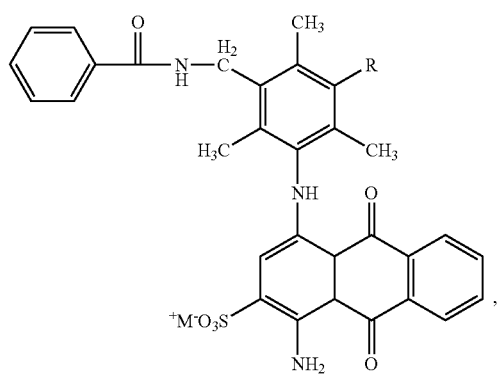

(II)

wherein R is hydrogen;

M is Na, K, Li, $NH_4$, $NH_2(C_2H_4OH)$, $NH(C_2H_4OH)_2$ or $N(C_2H_4OH)_3$.

A particularly preferred blue anthraquinone is 2-anthracenesulfonic acid, 1-amino-4-[[3-[(benzoylamino) methyl]-2,4,6-trimethylphenyl]amino]-9,10-dihydro-9,10-dioxo-, monosodium salt.

Another suitable blue anthraquinone dye is represented by formula (III)

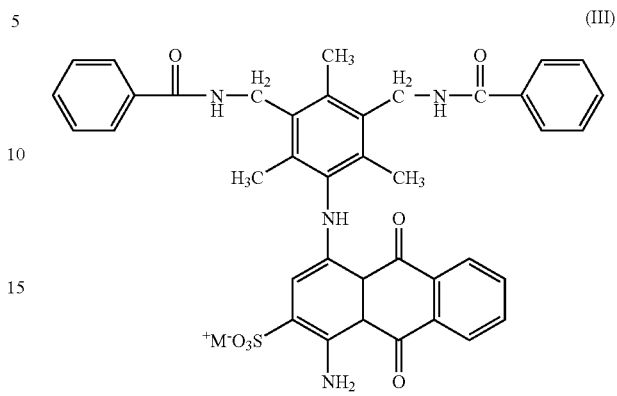

(III)

wherein

M is Na, K, Li, $NH_4$, $NH_2(C_2H_4OH)$, $NH(C_2H_4OH)_2$ or $N(C_2H_4OH)_3$.

A particularly preferred blue anthraquinone dye is 2-anthracenesulfonic acid, 1-amino-4-[[3,5-bis[(benzoylamino) methyl]-2,4,6-trimethylphenyl]amino]-9,10-dihydro-9,10-dioxo-, monosodium salt according to formula (III).

Another class of suitable dyes are the violet anthraquinone dyes in their unformulated form according to formula (IV)

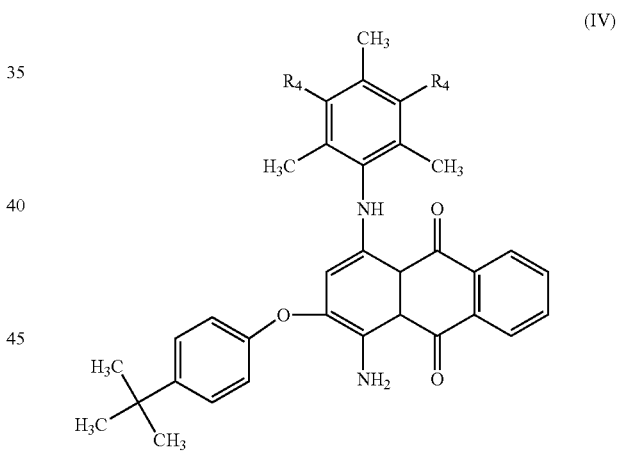

(IV)

wherein

R is H or a group of the formula $—CH_2—NH—CO—Y$ in which Y is an alkyl, alkenyl or aryl group, each optionally substituted one or more times with a halogen group selected from chlorine, fluorine and mixtures thereof, and at least one R group is other than hydrogen.

A particularly preferred violet anthraquinone is a combination of benzene sulfonic acid sodium salt and a mixture of 2 (or 5)-[[1-amino-4-[[3-[[(chloroacetyl) amino]methyl]-2,4,6-trimethylphenyl]amino]-9,10-dihydro-9,10-dioxo-2-anthracenyl]oxy]-5 (or 2)-(1,1-dimethylethyl)-, of formula (IV).

Such dyes are known and can be prepared by known methods. To get the unformulated dye, the dyes are isolated preferably by spray drying an aqueous dye solution for example from the dye synthesis. Thus, avoiding the method of out salting, filtration and washing.

The spray dried dye powder can be dry blended with a desired polymeric material, for example, in the form of flocks or granules in any suitable blending equipment, followed by melt processing. The process of extruding polyamide fibers is well known. The extruder can be any extruder used in the art for spinning fibers. Typically, such extruders melt the polyamide over several stages. The melt temperature will depend somewhat on the polyamide used, but will generally be in the range from about 240 to about 290° C., not to exceed 340° C., more preferably 320° C. Similarly, injection molding equipment is conventional and well known. The process of melt spinning is also known. Generally, such processes are carried out as for example described in the following patent examples.

Since the dye is completely dissolved during processing in the polymeric material, considerably less dye is used as compared with organic pigments to obtain certain color strength. Additionally, no pressure build up due to clogging of the spinnerets is observed when spun into fibers, even when spinning extremely low denier fibers. The fibers are strongly colored, exhibiting a high chroma and a high transparency. The woven textiles are more homogenously colored when compared to a bath dyed piece of textile.

Depending on its end use, the dye can be incorporated into the polymeric material at a concentration of about 0.01 to about 50% by weight, based on the polymeric material/dye composition. Thus, the dye can be incorporated optionally in the form of a masterbatch using roll mills, mixing or grinding machines, which can be let down to the appropriate color concentration. Or the dye can be incorporated directly in the final desired dye concentration for example in the concentration range of 0.01 to 3 percent based on the polymeric material to be colored.

To obtain different shades, it is also possible to add fillers or other chromophoric components such as organic or inorganic pigments like white, colored or black, effect, fluorescent or phosphorescent pigments, in any amount, to the polymeric material, in addition to the dye or mixture of dyes according to this invention.

Although the colored polymeric material of this invention show a good light and heat stability, it can be advantageous to apply the dye in the presence of commonly known or commercially available antioxidants, antistatic agents, UV absorbers, light stabilizers, processing agents and so forth.

The colorations obtained, for example in plastics or fibers have good all-round fastness properties such as high transparency, good fastness to bleed, migration, bleach resistance, heat, light, and weathering.

Surprisingly, it was discovered that colorations having a unique reflection spectra could be generated when using a selected dye or mixtures of dyes according to the present invention. As described in Example 1, when using for example the metal complex dye of formula I, black nylon fibers are obtained, demonstrating a strong absorption between 400 and 640 nm but starting to reflect strongly above 640 nm and in the near infrared region.

Therefore, by the inventive process polymeric fibers can be colored to obtain shades and fiber properties with a durability and a high transparency similar or better to bath dyed fibers with the great advantage of using the more economic and environmentally considerably more friendly melt spinning process.

Melt processing techniques are known in the art, and include for example extrusion, injection molding, rotomolding, compression molding, slush molding, blow molding, melt spinning and calendaring. The polymeric articles formed are fibers, films, molded articles, sheets, parts and profiles.

Processing apparatuses for the above techniques are well known and are melt spinning devices, film extrusion devices, extruders, molding devices, and the like.

Machines for melt blending are well known and are for example mixers, extruders and kneaders.

The present polymeric materials are for example melt blended with the unformulated dyes and granulated, followed by melt processing to yield the final colored product.

The present polymeric materials are for example mixed (as granules for example) with the unformulated dyes and melt processed into the final colored product.

The polymerization to prepare polyesters or polyamides is well known and involves the polymerization of for example caprolactam or alkylene dihydroxy or alkylene diamino condensation monomers with aliphatic or aromatic dicarboxylic acid condensation monomers Polyesters and polyamides are described for example in U.S. application Nos. 60/327,944, filed Oct. 9, 2001, 60/338,253, filed Dec. 6, 2001 and 60/400,158, filed Aug. 1, 2002 (published as WO 03/031507), the disclosure of which are hereby incorporated by reference.

The following examples further describe embodiments of this invention. The scope of the invention is not limited to the foregoing examples. In these examples all parts given are by weight unless otherwise indicated.

EXAMPLE 1

Nylon-6 granules, Type BS 700 from BASF are dried at 82° C. in a vacuum dryer for 12 hours. 500 grams dried nylon-6, 0.5 g black metal complex dye 2-naphthalenol-1-[(2-hydroxy-4-nitrophenyl) azo], chromium complex sodium salt of formula (I), 1.75 grams calcium stearate, 1.75 grams AC-8A polyethylene from Allied-Signal and 1.25 grams Irganox® B1171, 2.5 grams Chimassorb® 944L and 2.5 grams Tinuvin® 770, (all three stabilizers from Ciba Specialty Chemicals Corp.) are mixed and extruded on a Killion single screw extruder and granulated.

The granules are desiccant dried for 18 hours in an oven. The granules are spun into 9 denier fibers under standard conditions resulting in a deep black fiber with an attractive appearance. No pressure build up during the spinning process is observed and no aggregates are noticed when the fibers are observed under the microscope.

The fiber is wrapped onto a card and subjected to a light fastness test in a Xenon arc weather-0-meter and exposed for 100 hours AATCC 16 E exposure resulting in a gray scale note of 4 (gray scale 1 to 5 means, 5: best light stability, 1: worst light stability).

The wet fastness properties is tested according to the corresponding ISO standards, such as washing (ISO 105-CO3), Shampoo (IWS-TM-233-08/85), Dry heat (ISO 105-PO1), Rubbing (ISO 105-X12), Perspiration (ISO 105 E04), Dry cleaning (ISO 105-DO1), Water fastness (ISO 105-EO1) and Steam Plating (ISO 105-PO2) demonstrate excellent ratings with numbers of 4 and above.

The Severe Bleach test according to ISO 105-NO1, is measured at a concentration of 1.0%, demonstrated a rating of 3-4.

Thus, the results show that nylon-6 fibers colored by the melt spinning process with the present unformulated black dye manifest excellent heat stability and excellent textile fastness properties.

The reflection spectra of the fibers show a strong absorption between 400 and 640 nm and a strong reflection starting in the near infrared region above 640 nm.

EXAMPLE 2

The procedure of Example 1 is repeated, however, using instead of 0.1 grams of the black dye, the blue anthraquinone dyes 2-anthracenesulfonic acid, 1-amino-4-[[3-[(benzoylamino) methyl]-2,4,6-trimethylphenyl]amino]-9,10-dihydro-9,10-dioxo, monosodium salt, of formula (II), and 2-anthracenesulfonic acid, 1-amino-4-[[3,5-bis[(benzoylamino) methyl]-2,4,6-trimethylphenyl]amino]-9,10-dihydro-9,10-dioxo-, monosodium salt, of formula (III), yielding blue fibers showing an attractive appearance. No pressure build up during the spinning process is observed and no aggregates are noticed in the fibers when viewed under the microscope.

The fiber is wrapped onto a card and submitted to a light fastness test in a Xenon arc weather-0-meter and exposed for 100 hours MTCC 16 E exposure resulting in a gray scale note of 3-4.

The wet fastness properties tested according to the corresponding ISO standards, such as washing (ISO 105-CO3), Shampoo (IWS-TM-233-08/85), Dry heat (ISO 105-PO1), Rubbing (ISO 105-X12), Perspiration (ISO 105 E04), Dry cleaning (ISO 105-DO1), Water fastness (ISO 105-EO1) and Steam Plating (ISO 105-PO2) demonstrates good ratings with numbers for Washing and Water fastness of 3-4 and all the others of 4 and above.

The Severe Bleach test according to ISO 105-NO1, is measured at a concentration of 1.0%, demonstrated a rating of 4.

EXAMPLE 3

The procedure of Example 1 is repeated, however, using instead of 0.1 grams of the black dye, the violet anthraquinone dye benzene sulfonic acid sodium salt and a mixture of 2 (or 5)-[[1-amino-4-[[3-[[(chloroacetyl) amino]methyl]-2,4,6-trimethylphenyl]amino]-9,10-dihydro-9,10-dioxo-2-anthracenyl]oxy]-5 (or 2)-(1,1-dimethylethyl)-, of formula (IV), yielding violet fibers showing an attractive appearance. No pressure build up during the spinning process is observed and no aggregates are noticed in the fibers when viewed under the microscope.

The fiber is wrapped onto a card and submitted to a light fastness test in a Xenon arc weather-0-meter and exposed for 100 hours AATCC 16 E exposure resulting in a gray scale note of 4.

The wet fastness properties tested according to the corresponding ISO standards, such as washing (ISO 105-CO3), Shampoo (IWS-TM-233-08/85), Dry heat (ISO 105-PO1), Rubbing (ISO 105-X12), Perspiration (ISO 105 EO4), Dry cleaning (ISO 105-DO1), Water fastness (ISO 105-EO1) and Steam Plating (ISO 105-PO2) demonstrates excellent ratings with all numbers of 4 and above.

The Severe Bleach test according to ISO 105-NO1, is measured at a concentration of 1.0%, demonstrated a rating of 4.

EXAMPLE 4

A mixture of 100 g dry ULTRAMIDE B3K from BASF, 0.5 g of the black metal complex dye of formula (I) is blended for 15 minutes in a glass bottle on a roller gear. Extrusion of the mixture into a ribbon on a laboratory extruder produces a ribbon colored in a uniform black color possessing excellent light and heat stability.

EXAMPLE 5

The procedure of Example 4 is repeated, using, instead of the black dye, a mixture of blue anthraquinone dyes of formula (II) and formula (III) yielding an attractive strongly blue colored ribbon with similar good color fastness properties.

EXAMPLE 6

The procedure of Example 4 is repeated, using, instead of the black dye, the violet anthraquinone dye of formula (IV), yielding an attractive strongly violet colored ribbon with similar good color fastness properties.

EXAMPLE 7

A mixture of 100 g dry ULTRADUR, a polybutylene terephtalate from BASF, 0.5 g of the black metal complex dye of formula (I) is blended for 15 minutes in a glass bottle on a roller gear.

Extrusion of the mixture into a ribbon on a laboratory extruder produces a ribbon colored in a uniform black color possessing excellent light and heat stability.

EXAMPLE 8

A mixture of 100 g dry KODAPAK a polyethylene terephthalate from KODAK, 0.5 g of the violet anthraquinone dye of formula (IV) is blended for 15 minutes in a glass bottle on a roller gear. Extrusion of the mixture into a ribbon on a laboratory extruder produces a ribbon colored in a uniform violet color possessing excellent light and heat stability.

What is claimed is:

1. A method for producing a colored polymeric fiber via melt spinning, which method comprises melt spinning a blend of at least one unformulated heat stable black, blue or violet dye wherein the at least one unformulated blue or violet dye is selected from the group consisting of
B) a blue anthraquinone dye according to formula II

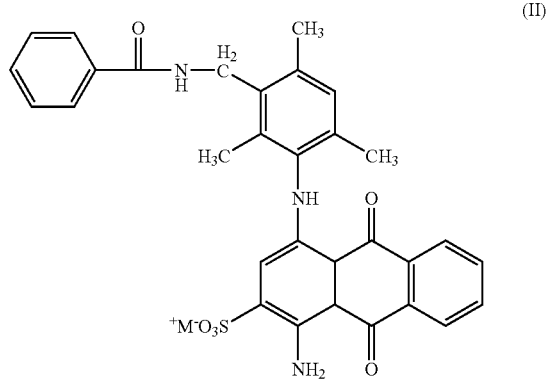

(II)

wherein

M is Na, K, Li, $NH_4$, $NH_2(C_2H_4OH)$, $NH(C_2H_4OH)_2$ or $N(C_2H_4OH)_3$,

C) a blue anthraquinone dye according to formula (III)

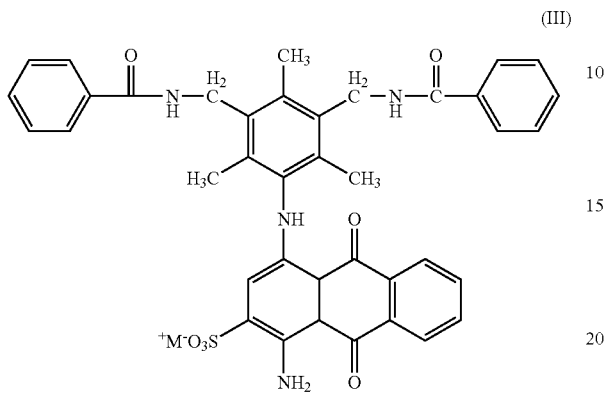

wherein

M is Na, K, Li, $NH_4$, $NH_2(C_2H_4OH)$, $NH(C_2H_4OH)_2$ or $N(C_2H_4OH)_3$, and D) a violet anthraquinone dye according to formula IV

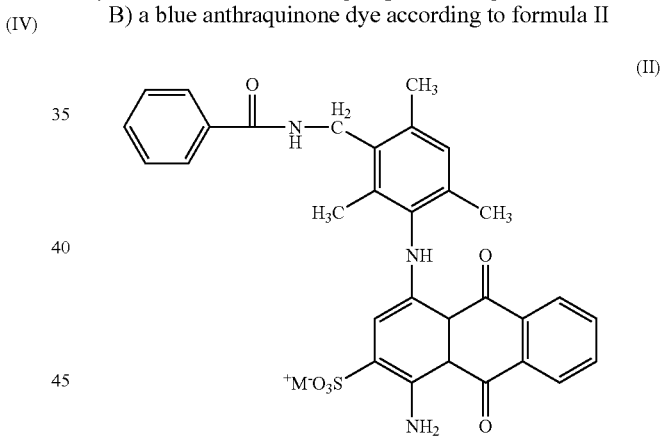

wherein R is H or a group of the formula —$CH_2$—NH—CO—Y in which Y is $C_1$-$C_4$ alkyl, $C_2$-$C_4$ alkenyl or an single or double ring aryl group, each optionally substituted one or more times with a halogen group selected from chlorine, fluorine and mixtures thereof, and at least one R group is other than hydrogen, and a polymeric material in a melt spinning device, wherein at least one portion of the device operates at a temperature greater than 220° C.

2. A method according to claim 1 wherein the polymeric material is nylon-6, nylon-12, nylon-6,6 or nylon-6,12.

3. A method according to claim 1 wherein the polymeric material is polyethylene terephthalate or polytrimethylene terephthalate.

4. A method according to claim 1 wherein the black dye is

A) a metal complex black dye according to formula I

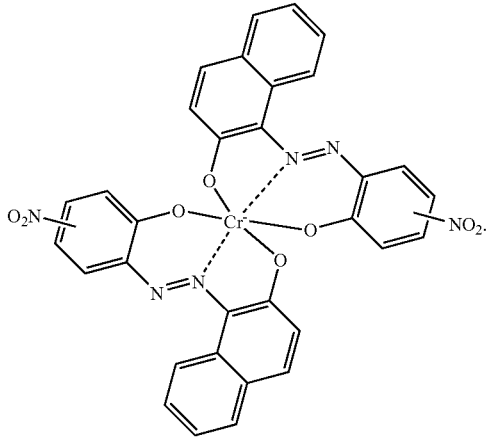

5. A method according to claim 1 wherein the dye is about 0.01 to about 50 percent by weight based on the total weight of the polymeric material and the dye.

6. A method according to claim 1 wherein the dye is about 0.01 to about 3 percent by weight based on the weight of the polymeric material.

7. A method for producing a colored polymeric article via melt processing, which method comprises melt processing a blend of at least one unformulated heat stable black, blue or violet dye wherein the at least one unformulated blue or violet dyes are selected from the group consisting of B) a blue anthraquinone dye according to formula II

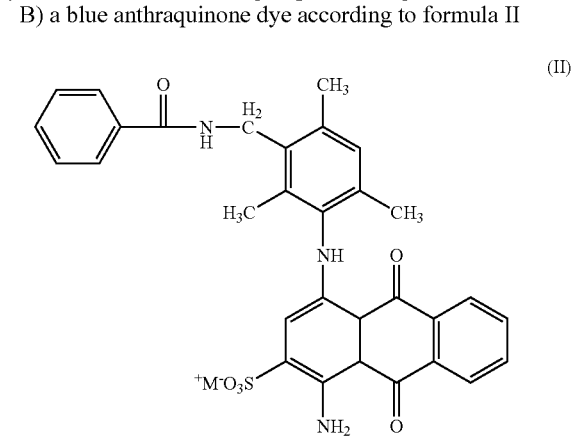

wherein

M is Na, K, Li, $NH_4$, $NH_2(C_2H_4OH)$, $NH(C_2H_4OH)_2$ or $N(C_2H_4OH)_3$,

C) a blue anthraquinone dye according to formula (III)

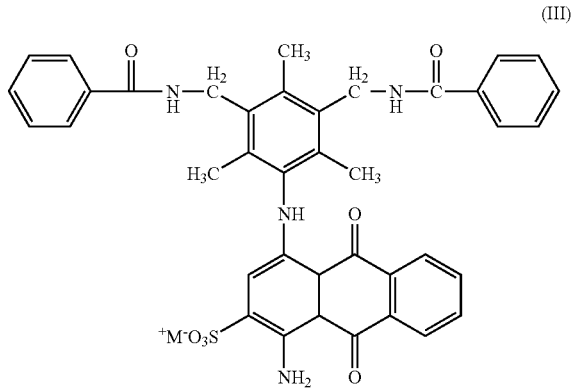

wherein

M is Na, K, Li, NH$_4$, NH$_2$(C$_2$H$_4$OH), NH(C$_2$H$_4$OH)$_2$ or N(C$_2$H$_4$OH)$_3$, and D) a violet anthraquinone dye according to formula IV

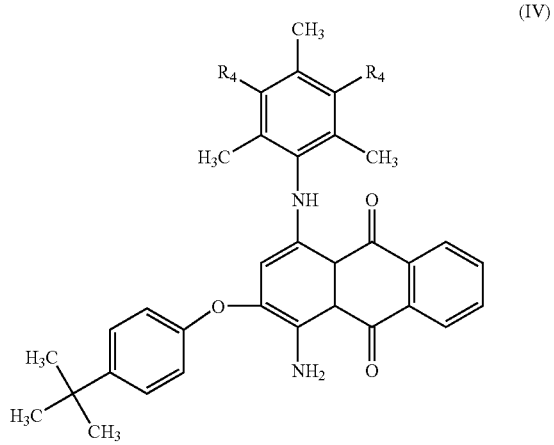

(IV)

wherein R is H or a group of the formula —CH$_2$—NH—CO—Y in which Y is C$_1$-C$_4$ alkyl, C$_2$-C$_4$ alkenyl or an single or double ring aryl group, each optionally substituted one or more times with a halogen group selected from chlorine, fluorine and mixtures thereof, and at least one R group is other than hydrogen, and a polymeric material in a suitable apparatus for a suitable time, wherein at least a portion of the apparatus operates at least part of the time at a temperature greater than 220° C.

8. A method according to claim 7 wherein the polymeric material is polyethylene terephthalate, polytrimethylene terephthalate, polybutylene terephthalate, polylactic acid, polyamide-6, polyamide-12, polyamide-6,6 or polyamide-6, 12.

9. A method according to claim 7 wherein the at least one unformulated black dye is A) a metal complex black dye according to formula I

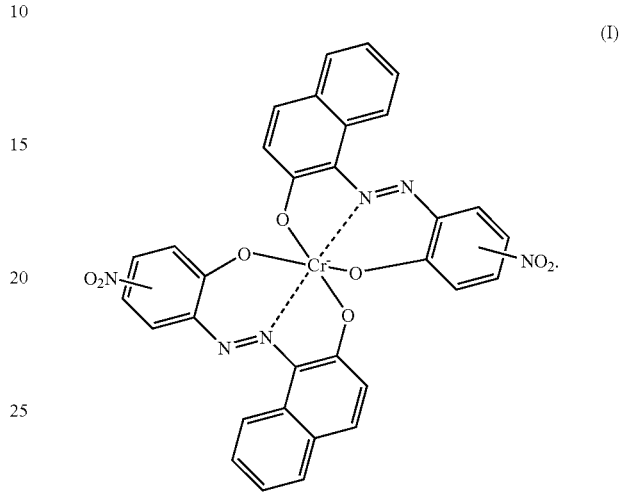

(I)

10. A method according to claim 7 wherein the dye is about 0.01 to about 50 percent by weight based on the total weight of the polymeric material and dye.

11. A method according to claim 7 wherein the dye is about 0.01 to about 3 percent by weight based on the weight of the polymeric material.

* * * * *